United States Patent
Liu et al.

(10) Patent No.: US 8,116,902 B2
(45) Date of Patent: Feb. 14, 2012

(54) METHOD OF DETECTING A DYNAMIC PATH OF A FIVE-AXIS MACHINE TOOL AND DECTECTING ASSEMBLY FOR THE SAME

(75) Inventors: Chien-Hung Liu, Yunlin Hsien (TW); Wen-Yuh Jywe, Yunlin Hsien (TW); Yi-Tsung Li, Yunlin Hsien (TW)

(73) Assignee: National Formosa University, Huwei Chen, Yunlin Hsien (TW)

( * ) Notice: Subject to any disclaimer, the term of this patent is extended or adjusted under 35 U.S.C. 154(b) by 219 days.

(21) Appl. No.: 12/713,181

(22) Filed: Feb. 26, 2010

(65) Prior Publication Data
US 2011/0213490 A1    Sep. 1, 2011

(51) Int. Cl.
*G06F 19/00* (2011.01)
*G01B 11/02* (2006.01)

(52) U.S. Cl. ......... 700/195; 700/174; 700/186; 356/498

(58) Field of Classification Search .......... 700/174–176, 700/177, 186, 193, 195; 356/498, 500
See application file for complete search history.

(56) References Cited

U.S. PATENT DOCUMENTS 5,768,137 A * 6/1998 Polidoro et al. ............... 700/186
2002/0003629 A1 * 1/2002 Matsui .......................... 356/614

* cited by examiner

*Primary Examiner* — Sean Shechtman
(74) *Attorney, Agent, or Firm* — patenttm.us

(57) ABSTRACT

A method of detecting a dynamic path of a five-axis machine tool having a spindle and a turntable and has a preparing step, a correcting step and a detecting step. The preparing step includes mounting a detector on the spindle, mounting a cat-eye reflector on the turntable, emitting a laser light to the cat-eye reflector, reflecting the laser light to the detector and splitting into two light beams. One of the light beams is emitted to a four-quadrant position sensitive detector. The correcting step includes rotating the detector, detecting a signal of the laser light by the four-quadrant position sensitive detector to eliminate an offset between the detecting assembly and the spindle. The detecting step includes detecting the dynamic path of the five-axis machine tool by detecting the positions of at least two of the linear axes and at least one of the rotation axes of the five-axis machine tool.

10 Claims, 8 Drawing Sheets

PREPARING STEP

CORRECTING STEP

DETECTING STEP

US 8,116,902 B2

METHOD OF DETECTING A DYNAMIC PATH OF A FIVE-AXIS MACHINE TOOL AND DECTECTING ASSEMBLY FOR THE SAME

BACKGROUND OF THE INVENTION

1. Field of the Invention

The present invention relates to a method of detecting a dynamic path of a five-axis machine tool, and more particularly to a method that can detect the dynamic path and multiple axes of the five-axis machine tool accurately at the same time.

2. Description of the Prior Arts

Two conventional methods are used to enhance technical grade and process precision of a multiple-axis machine tool (including linear and rotation axes). One is improving structural precision of the multiple-axis machine tool, but this method is time-consuming and costly and cannot meet actual needs of users. Another conventional method is detecting operating errors of the machine tool by a detecting system and supplementing the operating errors to enhance technical grade and process precision of the machine tool. This method is convenient and time-saving. Therefore, the method of detecting operating errors has come dominate multiple-axis machine tools.

The conventional detecting systems used to detect the operating error of the multiple-axis machine tool can be classified into four groups. Double Ball Bar (DBB) detecting systems that use a linear variable differential transformer (LVDT) to detect the operating error of axes of the machine tool along a circular path. Laser interferometers that use light wave interference to detect movement and operating errors of the axes of the machine tool. Grid Encoders that draw movement tracks of a tool of the machine tool as a 2-dimensional image to detect operation errors of the axes of the machine tool. Laser Double Ball Bar (LDBB) detecting systems that use the LVDT in place of the laser interferometer to increase the detecting range of the axes of the machine tool.

Although the conventional detecting systems can provide a detecting-correcting effect to the multiple-axis machine tool, structures of the conventional detecting systems are complicated so assembly and disassembly of the conventional detecting systems is difficult and inconvenient. Therefore, cost and time of detecting operating errors of the multiple-axis machine tool will be increased. Furthermore, conventional detecting systems only can detect the linear axes of the machine tool but can not operate in coordination with the rotation axes of the machine tool.

To overcome the shortcomings, the present invention provides a method of detecting a dynamic path of a five-axis machine tool to mitigate or obviate the aforementioned problems.

SUMMARY OF THE INVENTION

The main objective of the present invention is to provide a method of detecting a dynamic path of a five-axis machine tool, and more particularly to a method that can simultaneously detect the dynamic path of the five-axis machine tool and multiple axes accurately while also reducing cost of detecting the dynamic path of the five-axis machine tool.

The method of detecting a dynamic path of a five-axis machine tool having a spindle and a turntable in accordance with the present invention comprises a preparing step, a correcting step and a detecting step. The preparing step includes preparing a detecting assembly with a detector and a cat-eye reflector, mounting a detector on the spindle, mounting a cat-eye reflector on the turntable, emitting a laser light of a mini-interferometer in the detector to the cat-eye reflector, reflecting the laser light back to the detector and splitting the reflected laser light into two light beams. One of the light beams is emitted to the mini-interferometer and the other light beam is emitted to a four-quadrant position sensitive detector of the detector to obtain a three-linear position signal. The correcting step includes rotating the detector with the spindle at an angle of 360°, detecting a signal of the laser light between the cat-eye reflector and the detector by the mini-interferometer and the four-quadrant position sensitive detector to find an offset between the detecting assembly and the spindle and eliminating the offset to correct the position of the detecting assembly. The detecting step includes detecting the dynamic path of the five-axis machine tool by detecting the positions of at least two of the linear axes and at least one of the rotation axes of the five-axis machine tool.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
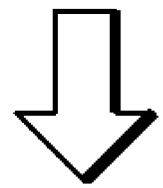
FIG. 1 is a block diagram of a method of detecting a dynamic path of a five-axis machine tool in accordance with the present invention.
Figure 1:
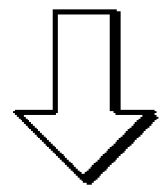

With reference to FIGS. 1 to 6, a method of detecting a dynamic path of a five-axis machine tool (40) in accordance with the present invention comprises a preparing step, a correcting step and a detecting step.

The five-axis machine tool (40) has three linear axes (X-, Y- and Z-axes), two rotation axes (A- and C-axes), a spindle (41) and a turning table (42). The spindle (41) is defined along the Z-axis of the five-axis machine tool (40). The turning table (42) is defined below the spindle (41) and is rotated about the Z-axis of the five-axis machine tool (40).

The preparing step comprises preparing a detecting assembly with a detector (10) and a cat-eye reflector (20), mounting the detector (10) on the spindle (41) of the five-axis machine tool (40) and mounting the cat-eye reflector (20) on the turntable (42) of the five-axis machine tool (40) to align with the detector (10) at a fixed distance.

Figure 2:
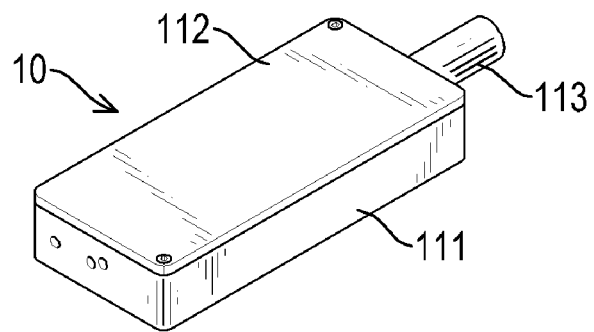
FIG. 2 is a perspective view of a detecting assembly in accordance with the present invention.
Figure 3:
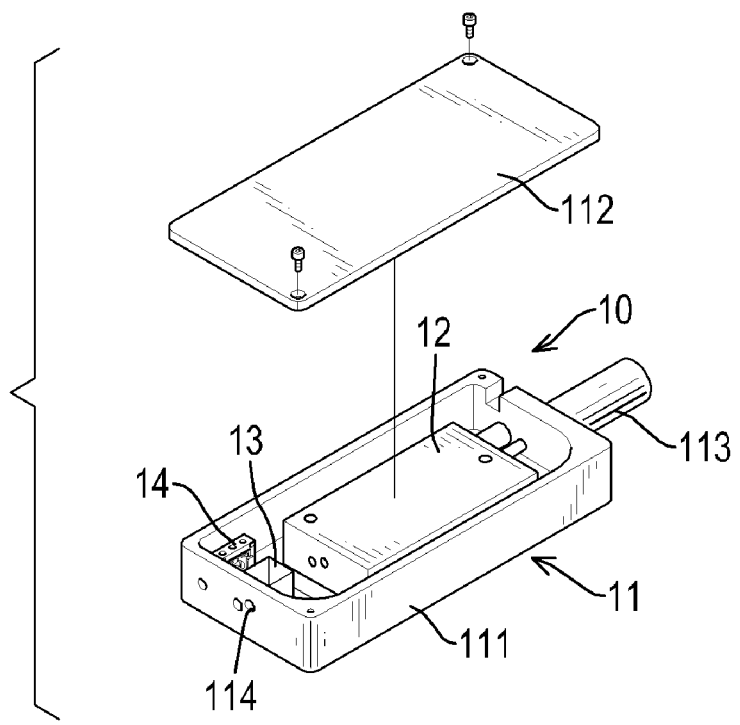
FIG. 3 is an exploded perspective view of the detecting assembly in FIG. 2.
Figure 4:
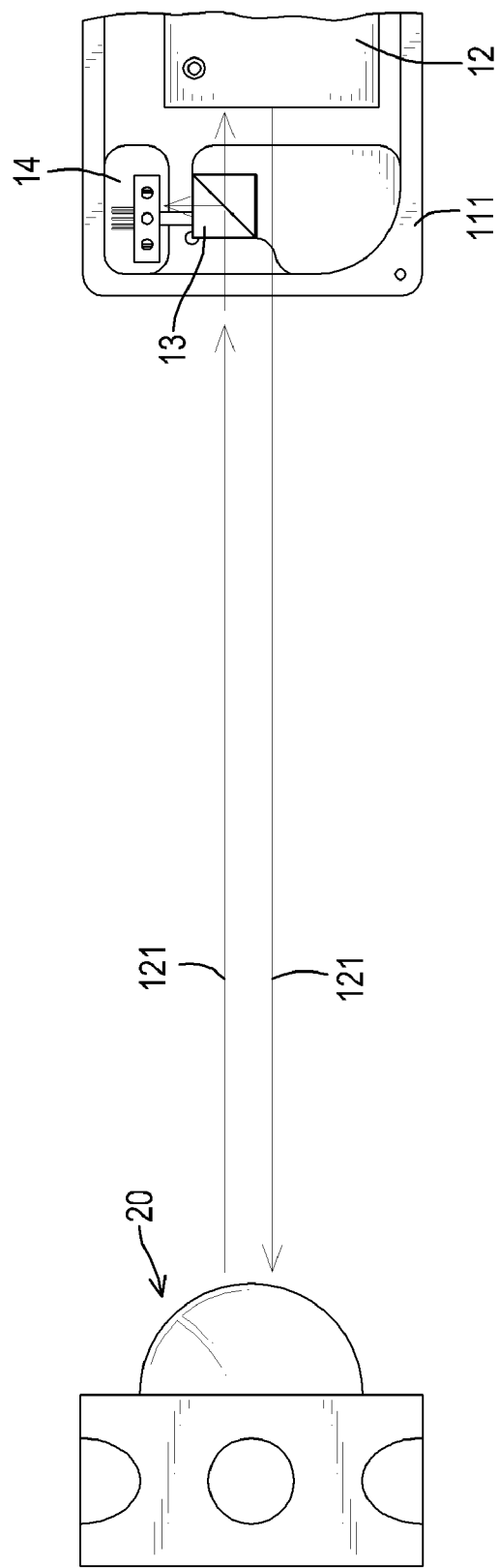
FIG. 4 is an enlarged operational top view of the detecting assembly in FIG. 3.
Figure 5:
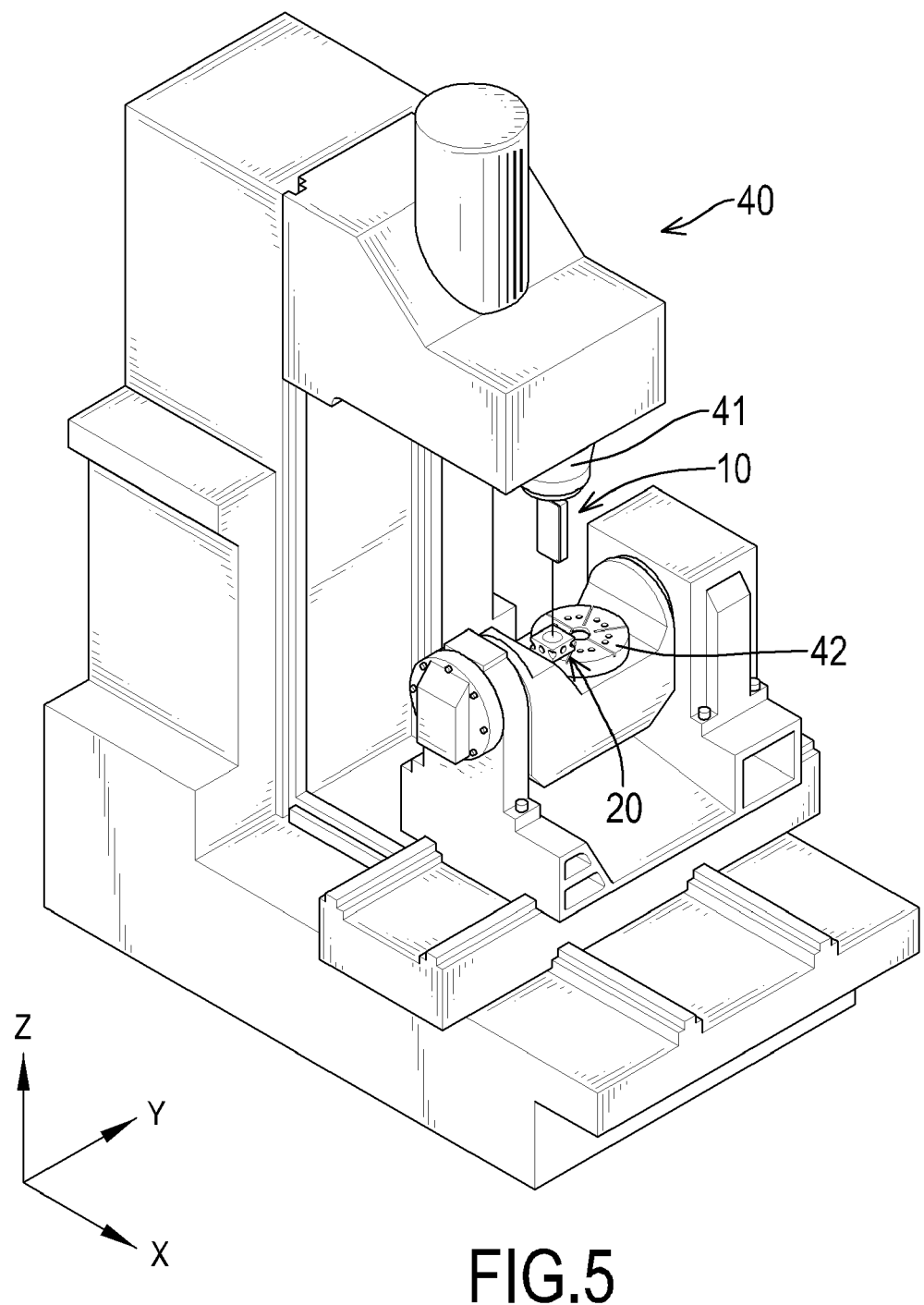
FIG. 5 is a perspective view of the detecting assembly in FIG. 2 mounted on a five-axis machine tool.
Figure 6:
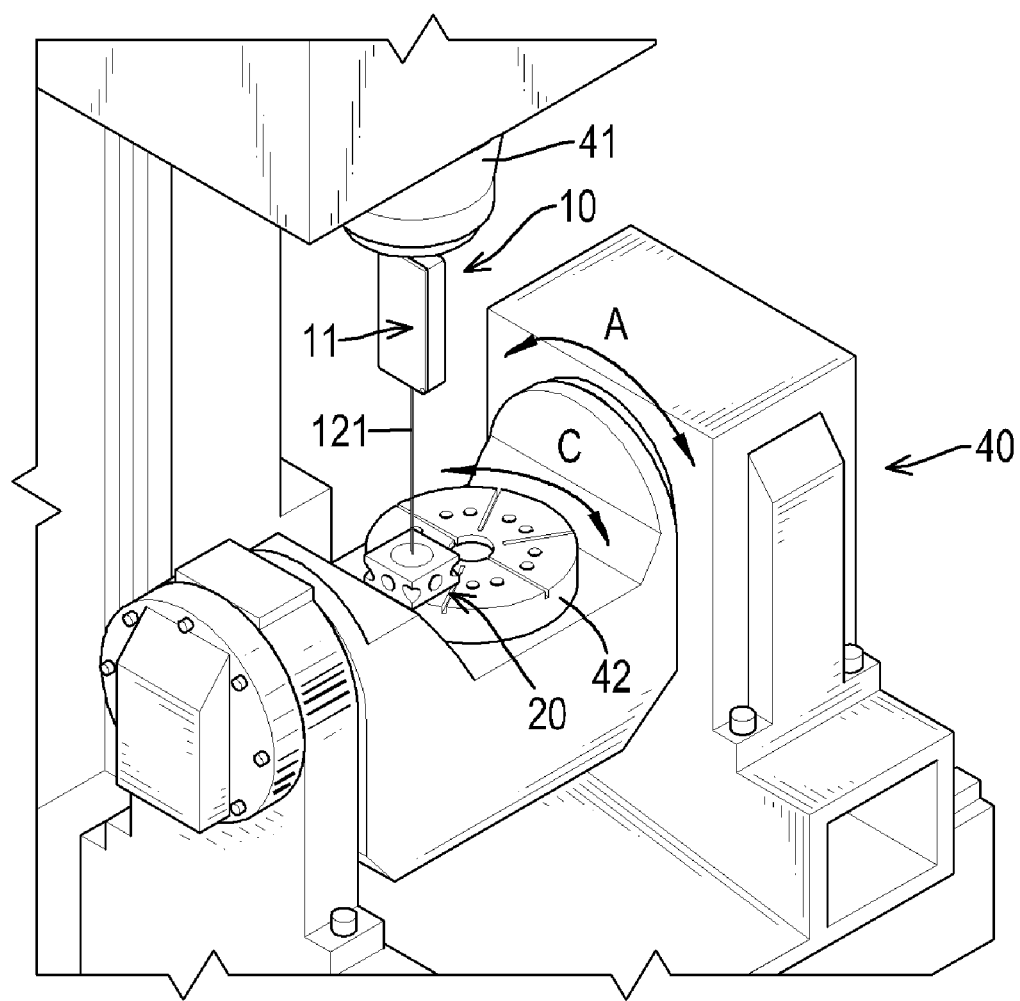
FIG. 6 is an enlarged operational perspective view of the detecting assembly in FIG. 5.

The detector (10) shown in FIGS. 2, 3 and 4 has a body (11), a mini-interferometer (12), a spectroscope (13) and a four-quadrant position sensitive detector (14).

The body (11) has a casing (111) and a cover (112). The casing (111) is connected to the spindle (41) and has a closed bottom, an open top, a chamber, two opposite sides, a mounting rod (113) and multiple through holes (114). The chamber is defined in the casing (111) between the closed bottom and the open top. The mounting rod (113) is formed on and protrudes from one of the opposite sides of the casing (111) and is mounted in the spindle (41) of the five-axis machine tool (40). The through holes (114) are formed through the other opposite side of the casing (111) and communicate with the chamber of the casing (111). The cover (112) is detachably connected to the open top of the casing (111) to close the chamber of the casing (111).

The mini-interferometer (12) is mounted in the chamber of the casing (111) and has a laser light (121) emitted out of the body (11) via one of the through holes (114) of the casing (111).

The spectroscope (13) is mounted in the chamber of the casing (111) of the body (11) between the mini-interferometer (12) and the through holes (114) of the casing (111) to split the laser light (121) of the mini-interferometer (12) reflected by the cat-eye reflector (20) into two light beams.

The four-quadrant position sensitive detector (14) is mounted in the chamber of the casing (111) of the body (11) between the casing (111) and the spectroscope (13). One of the light beams of the laser light (121) is emitted to the mini-interferometer (12) and the other light beam of the laser light (121) is emitted to the four-quadrant position sensitive detector (14).

The cat-eye reflector (20) is mounted on the turntable (42) of the five-axis machine tool (40), faces and aligns with the detector (10) to receive the laser light (121) of the mini-interferometer (12) and to reflect the laser light (121) to the body (11) via another through hole (114) of the casing (111). Then, the laser light (121) can be split into two light beams respectively emitted to the mini-interferometer (12) and the position sensitive detector (14).

After the detector (10) and the cat-eye reflector (20) are respectively mounted on the spindle (41) and the turntable (42) of the five-axis machine tool (40), laser light (121) is emitted from the mini-interferometer (12) in the detector (10) toward the cat-eye reflector (20) and reflected back to the mini-interferometer (12) by the cat-eye reflector (20). Reflected laser light (121) is split into two light beams by the spectroscope (13), one of the light beams is emitted to the mini-interferometer (12) and the other light beam is emitted to a four-quadrant position sensitive detector (14) of the detector (10) to obtain a three-linear position signal. The mini-interferometer (12) can detect one of the three-linear positions and the four-quadrant position sensitive detector (14) can detect the other two of the three-linear positions.

The correcting step comprises rotating the detector (10) with the spindle (41) of the five-axis machine tool (40) at an angle of 360° and detecting signals of the laser light (121) between the cat-eye reflector (20) and the detector (10) by the mini-interferometer (12) and the four-quadrant position sensitive detector (14) to find an offset between the detector (10) of the detecting assembly and the spindle (41) of the five-axis machine tool (40). After the offset is detected by the mini-interferometer (12) and the four-quadrant position sensitive detector (14) of the detector (10), the offset is eliminated by correcting the position of the detector (10) of the detecting assembly relative to the spindle (41) of the five-axis machine tool (40).

Preferably, the present invention has two correcting manners, one of the correcting manners is moving the Z-axis of the machine tool (40) to obtain a three-linear signal: ($X_{wr}$, $Y_{wr}$, $Z_{wr}$) by the mini-interferometer (12) and the four-quadrant position sensitive detector (14) and correcting the position of the X-axis according to a rotating angle (θ). After correcting the position of the X-axis, a rotating angle (θ') of the Y-axis can be calculated by the correcting data of the X-axis. After the positions of the X-axis and the Y-axis have been corrected, moving the Y-axis to obtain a rotating angle (θ") of the Z-axis. Then, a correcting three-linear signal (X, Y, Z) can be calculated by a homogeneous coordinate system matrix of equation (1).

$$T = \begin{bmatrix} \cos\theta'' & -\sin\theta'' & 0 & 0 \\ \sin\theta'' & \cos\theta'' & 0 & 0 \\ 0 & 0 & 1 & 0 \\ 0 & 0 & 0 & 1 \end{bmatrix}^{-1} \begin{bmatrix} \cos\theta' & 0 & \sin\theta' & 0 \\ 0 & 1 & 0 & 0 \\ -\sin\theta' & 0 & \cos\theta' & 0 \\ 0 & 0 & 0 & 1 \end{bmatrix}^{-1} \quad (1)$$

$$\left( \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}^{-1} \begin{bmatrix} X_{wr} \\ Y_{wr} \\ Z_{wr} \\ 1 \end{bmatrix} \right) = \begin{bmatrix} X \\ Y \\ Z \\ 1 \end{bmatrix}$$

The other correcting manner is moving the Z-axis of the machine tool (40) to obtain a three-linear signal: ($X_{wr}$, $Y_{wr}$, $Z_{wr}$) by the mini-interferometer (12) and the four-quadrant position sensitive detector (14) and correcting the position of the Y-axis according to a rotating angle (θ'). After correcting the position of the Y-axis, a rotating angle (θ) of the X-axis can be calculated by the correcting data of the Y-axis. After the positions of the Y-axis and the X-axis have been corrected, moving the X-axis to obtain a rotating angle (θ") of the Z-axis. Then, a correcting three-linear signal (X, Y, Z) can be calculated by a homogeneous coordinate system matrix of equation (2).

$$T = \begin{bmatrix} \cos\theta'' & -\sin\theta'' & 0 & 0 \\ \sin\theta'' & \cos\theta'' & 0 & 0 \\ 0 & 0 & 1 & 0 \\ 0 & 0 & 0 & 1 \end{bmatrix}^{-1} \begin{bmatrix} 1 & 0 & 0 & 0 \\ 0 & \cos\theta' & -\sin\theta' & 0 \\ 0 & \sin\theta' & \cos\theta' & 0 \\ 0 & 0 & 0 & 1 \end{bmatrix}^{-1} \quad (2)$$

$$\left( \begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix}^{-1} \begin{bmatrix} X_{wr} \\ Y_{wr} \\ Z_{wr} \\ 1 \end{bmatrix} \right) = \begin{bmatrix} X \\ Y \\ Z \\ 1 \end{bmatrix}$$

The detecting step comprises detecting the dynamic path of the five-axis machine tool (40) by detecting the positions of at least two of the linear axes (X-axis, Y-axis and Z-axis) and at least one of the rotation axes (A-axis and C-axis) to find the dynamic path of the five-axis machine tool (40). Preferably, the present invention has three detecting types to detect the dynamic path of the five-axis machine tool (40).

Figure 7:
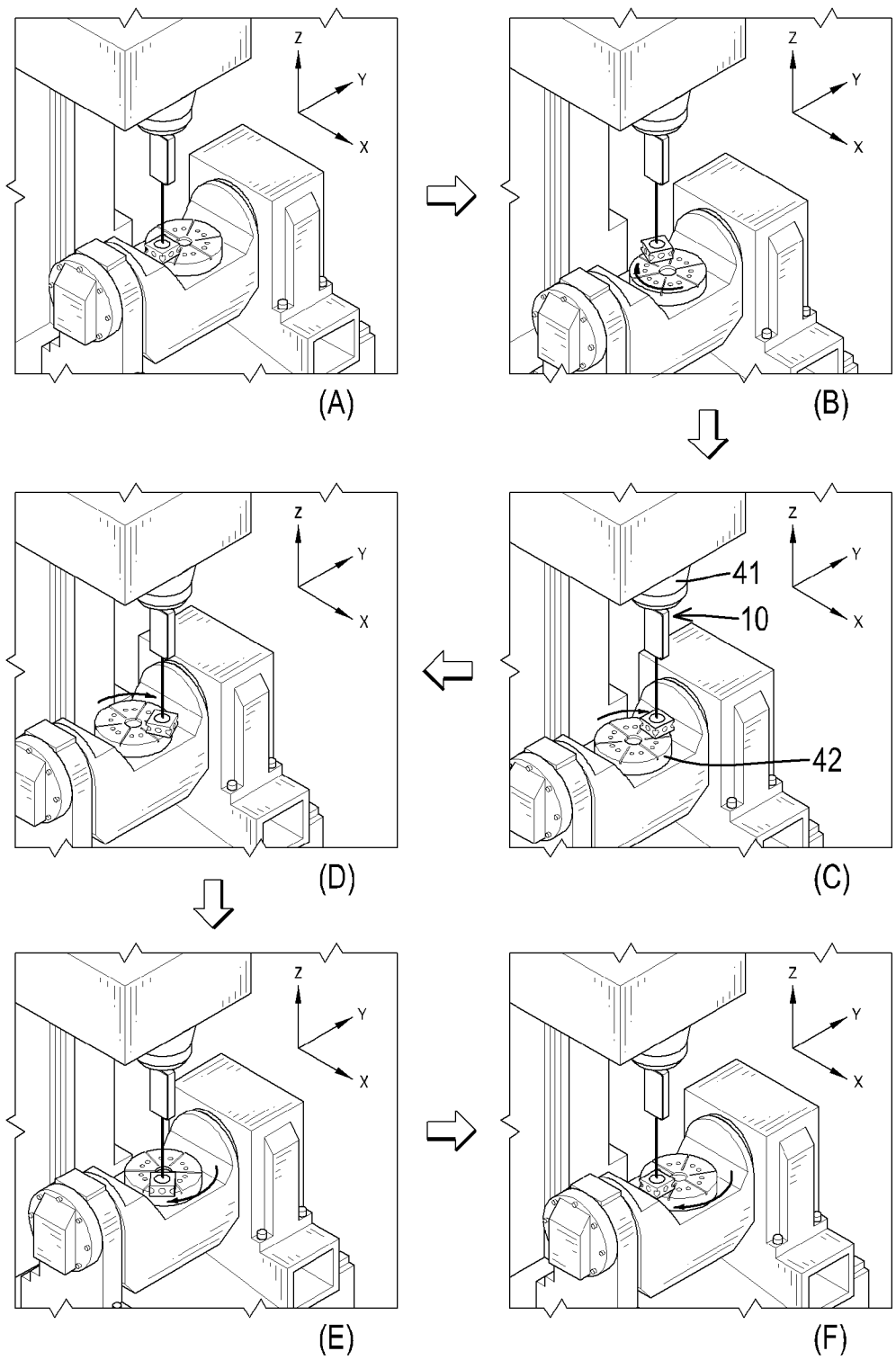
FIGS. 7(A) to 7(F) are operational perspective views of the method in FIG. 5 showing a rotation around a Z-axis of the machine tool.

With reference to FIG. 7, the first detecting type of detecting the dynamic path of the five-axis machine tool (40) is X-Y-axes in accordance with a C-axis. In this detecting type, the C-axis is rotated around the Z-axis, the X-axis and the Y-axis of the five-axis machine tool (40) are moved to keep the laser light (121) of the mini-interferometer (12) emitting to a center of the cat-eye reflector (20). When the detector (10)

on the spindle (41) is moved with the X-axis and the Y-axis of the five-axis machined tool (40) to emit laser light (121) to the center of the cat-eye reflector (20), the dynamic path of the five-axis machine tool (40) can be detected by the operating data of the X-axis, the Y-axis and the C-axis.

Figure 8:
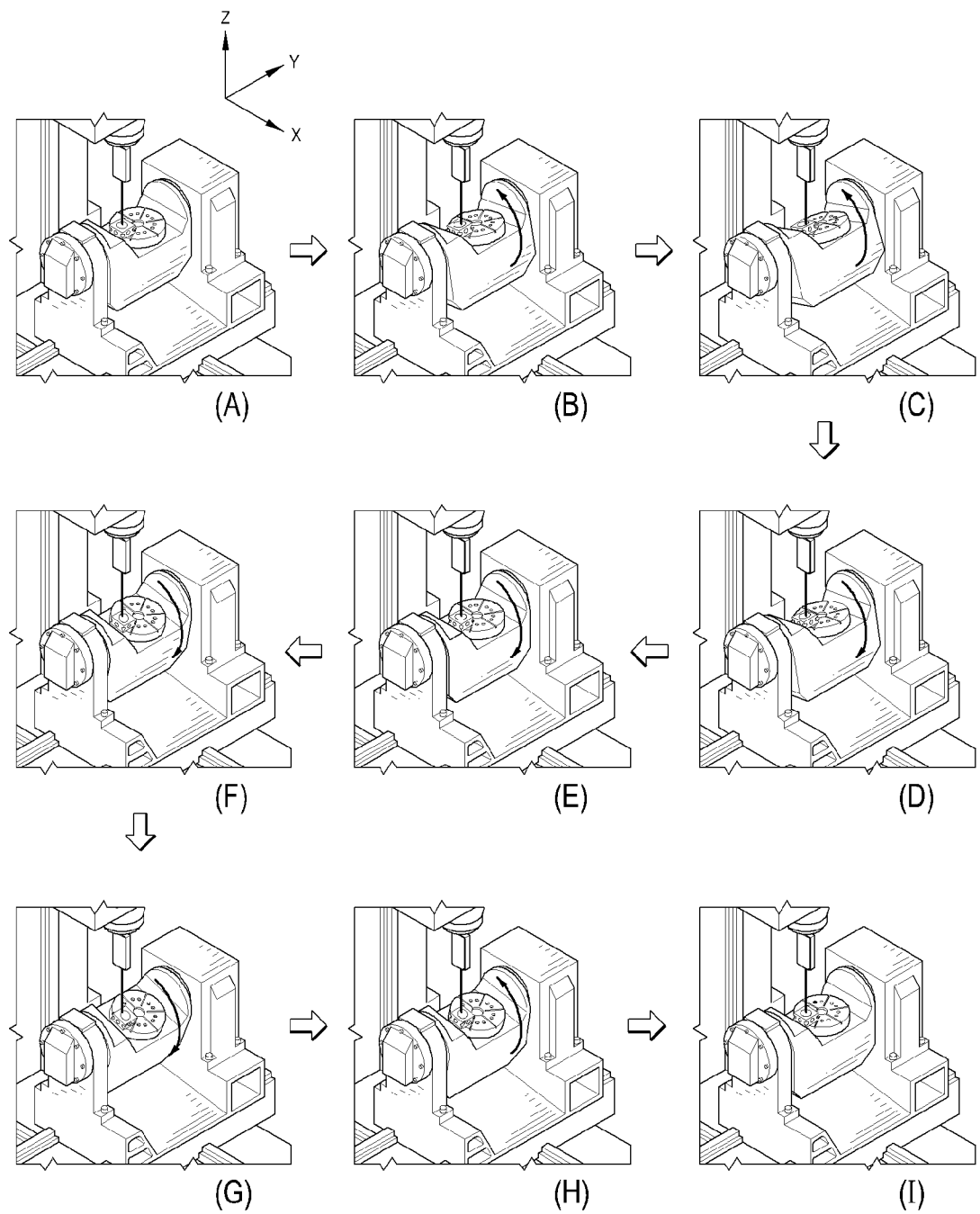
FIGS. 8(A) to 8(I) are operational perspective views of the method in FIG. 5 showing a movement around a X-axis of the machine tool.

With reference to FIG. 8, the second detecting type of detecting the dynamic path of the five-axis machine tool (40) is Y-Z-axes in accordance with an A-axis of the five-axis machine tool (40). In this type, the A-axis is rotated along the X-axis, the Y-axis and the Z-axis of the five-axis machine tool (40) are moved to keep the laser light (121) of the mini-interferometer (12) emitting to a center of the cat-eye reflector (20). When the detector (10) on the spindle (41) is moved around the Y-axis and the Z-axis of the five-axis machined tool (40) to emit laser light (121) to the center of the cat-eye reflector (20), the dynamic path of the five-axis machine tool (40) can be detected by operating data of the Y-, Z- and A-axes.

Figure 9:
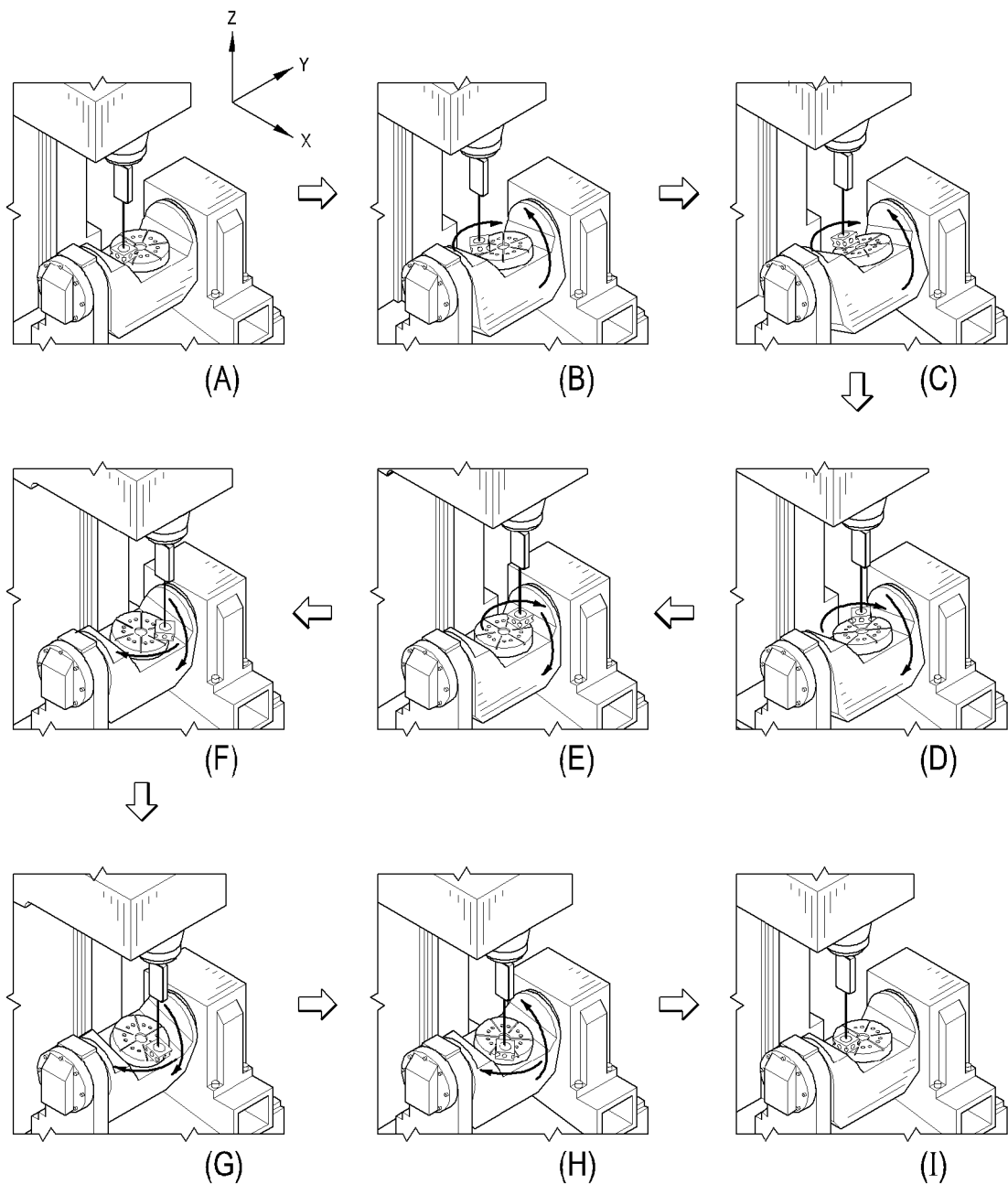
FIGS. 9(A) to 9(I) are operational perspective views of the method in FIG. 1 showing a movement around X-, Y- and Z-axes of the machine tool.

With reference to FIG. 9, the third detecting type of detecting the dynamic path of the five-axis machine tool (40) is X-Y-Z-axes in accordance with the A-C-axes of the five-axis machine tool (40). In this type, the C-axis is rotated along the Z-axis, the A-axis is rotated along the X-axis, the X-axis and the Y-axis are moved to follow a circular path along the C-axis, the Z-axis is moved follow a circular path along the A-axis and the Y-axis is moved follow a circular path along the A-axis and the C-axis to keep the laser light (121) of the mini-interferometer (12) emitting to a center of the cat-eye reflector (20). When the detector (10) on the spindle (41) is moved with the X-axis, the Y-axis and the Z-axis of the five-axis machined tool (40) to emit laser light (121) to the center of the cat-eye reflector (20), the dynamic path of the five-axis machine tool (40) can be detected by the operating data of the X-axis, the Y-axis, the Z-axis, the A-axis and the C-axis.

The method of detecting a dynamic path of a five-axis machine tool in accordance with the present invention uses the mini-interferometer (12) and the four-quadrant position sensitive detector (14) to provide a 3-dimension detecting system. In assembly, only the detector (10) need be connected with the spindle (41) of the five-axis machine tool (40) and the cat-eye reflector (20) mounted on the turntable (42) and aligned with the detector (10) at a fixed distance. Then, the detecting assembly is completely assembled on the five-axis machine tool (40) and this is convenient and timesaving to decrease the cost and time of detecting the operating error of the five-axis machine tool (40).

In detection, the laser light (121) of the mini-interferometer (12) is emitted to the cat-eye reflector (20) and is reflected back to the detector (10) and split into the mini-interferometer (12) and the four-quadrant position sensitive detector (14). Then, the mini-interferometer (12) and the four-quadrant position sensitive detector (14) can detect the position error of the linear axes (X-axis, Y-axis, Z-axis) of the machine tool (40) to provide three linear-movement signals.

Furthermore, when the operating error of the five-axis machine tool (40) is detected and corrected by the method and the detecting assembly in accordance with the present invention, there are three detecting types that can be used to detect the dynamic path of the five-axis machine tool (40). In the detecting types of the method, at least two of the linear axes (X-axis, Y-axis and Z-axis) are operated in coordination with at least one of the rotation axes (A-axis and C-axis) simultaneously to find the dynamic path of the five-axis machine tool (40) at the same time, and the detecting time and cost can be reduced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method of detecting a dynamic path of a five-axis machine tool having three linear axes (X-, Y- and Z-axes), two rotation axes (A- and C-axes), a spindle defined along the Z-axis of the five-axis machine tool and a turning table defined below the spindle and rotated about the Z-axis of the five-axis machine tool, and the method comprising:
   a preparing step comprising:
      preparing a detecting assembly with a detector and a cat-eye reflector
      mounting the detector on the spindle of the five-axis machine tool;
      mounting the cat-eye reflector on the turntable of the five-axis machine tool to align with the detector at a fixed distance;
      emitting a laser light of a mini-interferometer in the detector to the cat-eye reflector and reflecting back to the mini-interferometer by the cat-eye reflector; and
      setting a spectroscope in the detector between the reflected laser light and the mini-interferometer to split the reflected laser light into two light beams, one of the light beams emitted to the mini-interferometer and the other light beam emitted to a four-quadrant position sensitive detector of the detector to obtain a three-linear position signal;
   a correcting step comprising:
      rotating the detector with the spindle of the five-axis machine tool at an angle of 360°;
      detecting signals of the laser light between the cat-eye reflector and the detector by the mini-interferometer and the four-quadrant position sensitive detector to find an offset between the detector of the detecting assembly and the spindle of the five-axis machine tool; and
      eliminating the offset by correcting the position of the detector of the detecting assembly relative to the spindle of the five-axis machine tool; and
   a detecting step comprising detecting the positions of at least two of the linear axes (X-axis, Y-axis and Z-axis) and at least one of the rotation axes (A-axis and C-axis) to find the dynamic path of the five-axis machine tool.

2. The method as claimed in claim 1, wherein a correcting manner provided in the correcting step comprises
   moving the Z-axis of the machine tool to obtain a three-linear signal ($X_{wr}$, $Y_{wr}$, $Z_{wr}$) by the mini-interferometer and the four-quadrant position sensitive detector;
   correcting the position of the X-axis according to a rotating angle ($\theta$);
   calculating a rotating angle ($\theta'$) of the Y-axis by the correcting data of the X-axis;
   moving the Y-axis to obtain a rotating angle ($\theta''$) of the Z-axis after the positions of the X-axis and the Y-axis have been corrected; and
   calculating a correcting three-linear signal (X, Y, Z) by a homogeneous coordinate system matrix of an equation (1), below:

$$T = \begin{bmatrix} \cos\theta'' & -\sin\theta'' & 0 & 0 \\ \sin\theta'' & \cos\theta'' & 0 & 0 \\ 0 & 0 & 1 & 0 \\ 0 & 0 & 0 & 1 \end{bmatrix}^{-1}$$

$$\left[ \begin{bmatrix} \cos\theta' & 0 & \sin\theta' & 0 \\ 0 & 1 & 0 & 0 \\ -\sin\theta' & 0 & \cos\theta' & 0 \\ 0 & 0 & 0 & 1 \end{bmatrix}^{-1} \left( \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}^{-1} \begin{bmatrix} X_{wr} \\ Y_{wr} \\ Z_{wr} \\ 1 \end{bmatrix} \right) \right] = \begin{bmatrix} X \\ Y \\ Z \\ 1 \end{bmatrix}.$$

3. The method as claimed in claim 2, wherein a further correcting manner provided in the correcting step comprises
moving the Z-axis of the machine tool to obtain a three-linear signal ($X_{wr}$, $Y_{wr}$, $Z_{wr}$) by the mini-interferometer and the four-quadrant position sensitive detector;
correcting the position of the Y-axis according to a rotating angle ($\theta'$);
calculating a rotating angle ($\theta$) of the X-axis by the correcting data of the Y-axis;
moving the X-axis to obtain a rotating angle ($\theta''$) of the Z-axis after the positions of the X-axis and the Y-axis have been corrected; and
calculating a correcting three-linear signal (X, Y, Z) by a homogeneous coordinate system matrix of equation (2), below:

$$T = \begin{bmatrix} \cos\theta'' & -\sin\theta'' & 0 & 0 \\ \sin\theta'' & \cos\theta'' & 0 & 0 \\ 0 & 0 & 1 & 0 \\ 0 & 0 & 0 & 1 \end{bmatrix}^{-1} \left[ \begin{bmatrix} 1 & 0 & 0 & 0 \\ 0 & \cos\theta' & -\sin\theta' & 0 \\ 0 & \sin\theta' & \cos\theta' & 0 \\ 0 & 0 & 0 & 1 \end{bmatrix}^{-1} \right. \quad (2)$$

$$\left. \left( \begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix}^{-1} \begin{bmatrix} X_{wr} \\ Y_{wr} \\ Z_{wr} \\ 1 \end{bmatrix} \right) \right] = \begin{bmatrix} X \\ Y \\ Z \\ 1 \end{bmatrix}.$$

4. The method as claimed in claim 1, wherein a correcting manner provided in the correcting step comprises
moving the Z-axis of the machine tool to obtain a three-linear signal ($X_{wr}$, $Y_{wr}$, $Z_{wr}$) by the mini-interferometer and the four-quadrant position sensitive detector;
correcting the position of the Y-axis according to a rotating angle ($\theta'$);
calculating a rotating angle ($\theta$) of the X-axis by the correcting data of the Y-axis;
moving the X-axis to obtain a rotating angle ($\theta''$) of the Z-axis after the positions of the X-axis and the Y-axis have been corrected; and
calculating a correcting three-linear signal (X, Y, Z) by the homogeneous coordinate system matrix of equation (2).

5. The method as claimed in claim 3, wherein in the detecting step, a detecting type is X-Y-axes in accordance with a C-axis and has
rotating the C-axis along the Z-axis;
moving the X-axis and the Y-axis of the five-axis machine tool to keep the laser light of the mini-interferometer emitting to a center of the cat-eye reflector; and
detecting a dynamic path of the five-axis machine tool by the operating data of the X-axis, the Y-axis and the C-axis of the five-axis machine tool.

6. The method as claimed in claim 5, wherein in the detecting step, a detecting type is Y-Z-axes in accordance with an A-axis comprises
rotating the A-axis along the Z-axis;
moving the Y-axis and the Z-axis of the five-axis machine tool to keep the laser light of the mini-interferometer emitting to a center of the cat-eye reflector; and
detecting a dynamic path of the five-axis machine tool by operating data of the Y-axis, the Z-axis and the A-axis of the five-axis machine tool.

7. The method as claimed in claim 6, wherein in the detecting step, a detecting type is X-Y-Z-axes in accordance with A-C-axes comprises
rotating the C-axis along the Z-axis and rotating the A-axis along the Y-axis;
moving the X-axis and the Y-axis follow a circular path along the C-axis, moving the Z-axis follow a circular path along the A-axis and moving the Y-axis follow a circular path along the A-axis and the C-axis to keep the laser light of the mini-interferometer emitting to a center of the cat-eye reflector; and
detecting a dynamic path of the five-axis machine tool by the operating data of the X-axis, Y-axis, the Z-axis, the A-axis and the C-axis of the five-axis machine tool.

8. The method as claimed in claim 4, wherein in the detecting step, a detecting type is X-Y-axes in accordance with a C-axis comprises
rotating the C-axis along the Z-axis;
moving the X-axis and the Y-axis of the five-axis machine tool to keep the laser light of the mini-interferometer emitting to a center of the cat-eye reflector; and
detecting a dynamic path of the five-axis machine tool by the operating data of the X-axis, the Y-axis and the C-axis of the five-axis machine tool.

9. The method as claimed in claim 8, wherein in the detecting step, a detecting type is Y-Z-axes in accordance with an A-axis comprises
rotating the A-axis along the X-axis;
moving the Y-axis and the Z-axis of the five-axis machine tool to keep the laser light of the mini-interferometer emitting to a center of the cat-eye reflector; and
detecting a dynamic path of the five-axis machine tool by the operating data of the Y-axis, the Z-axis and the A-axis of the five-axis machine tool.

10. The method as claimed in claim 9, wherein in the detecting step, a detecting type is X-Y-Z-axes in accordance with A-C-axes comprises
rotating the C-axis along the Z-axis and rotating the A-axis along the X-axis;
moving the X-axis and the Y-axis follow a circular path along the C-axis, moving the Z-axis follow a circular path along the A-axis and moving the Y-axis follow a circular path along the A-axis and the C-axis to keep the laser light of the mini-interferometer emitting to a center of the cat-eye reflector; and
detecting a dynamic path of the five-axis machine tool by the operating data of the X-axis, Y-axis, the Z-axis, the A-axis and the C-axis of the five-axis machine tool.

* * * * *